(12) United States Patent
Naganuma (10) Patent No.: US 11,069,337 B2
(45) Date of Patent: Jul. 20, 2021

(54) VOICE-CONTENT CONTROL DEVICE, VOICE-CONTENT CONTROL METHOD, AND NON-TRANSITORY STORAGE MEDIUM

(71) Applicant: JVC KENWOOD Corporation, Yokohama (JP)

(72) Inventor: Tatsumi Naganuma, Yokohama (JP)

(73) Assignee: JVC KENWOOD Corporation, Yokohama (JP)

( * ) Notice: Subject to any disclaimer, the term of this patent is extended or adjusted under 35 U.S.C. 154(b) by 108 days.

(21) Appl. No.: 16/290,983

(22) Filed: Mar. 4, 2019

(65) Prior Publication Data
US 2019/0279611 A1 Sep. 12, 2019

(30) Foreign Application Priority Data
Mar. 6, 2018 (JP) .............................. JP2018-039754

(51) Int. Cl.
*G10L 13/08* (2013.01)
*G10L 17/26* (2013.01)
(Continued)

(52) U.S. Cl.
CPC .............. *G10L 13/08* (2013.01); *G06F 3/167* (2013.01); *G10L 15/08* (2013.01); *G10L 15/16* (2013.01); *G10L 15/18* (2013.01); *G10L 15/1807* (2013.01); *G10L 15/22* (2013.01); *G10L 17/26* (2013.01); *G10L 15/183* (2013.01);
(Continued)

(58) Field of Classification Search
CPC . G06N 3/08; G06N 20/00; G06N 3/02; G10L 15/22; G10L 15/16; G10L 15/1815; G10L 2015/223; G10L 2015/227; G10L 15/24; G06F 16/90332; G06F 40/205; G06F 40/30; G06F 16/285; G06F 3/167; G06F 16/3344; G06F 40/268; G06F 40/284;
(Continued)

(56) References Cited

U.S. PATENT DOCUMENTS 5,852,804 A 12/1998 Sako
2013/0325471 A1* 12/2013 Rachevsky ............ G06N 20/00
704/244

(Continued)

FOREIGN PATENT DOCUMENTS

JP 04-204700 7/1992

*Primary Examiner* — Linda Wong
(74) *Attorney, Agent, or Firm* — Amin, Turocy & Watson, LLP (57) ABSTRACT

A voice-content control device includes a voice classifying unit configured to analyze a voice spoken by a user and acquired by a voice acquiring unit to classify the voice as either one of a first voice or a second voice, a process executing unit configured to analyze the acquired voice to execute processing required by the user, and a voice-content generating unit configured to generate, based on content of the executed processing, output sentence that is text data for a voice to be output to the user, wherein the voice-content generating unit is further configured to generate a first output sentence as the output sentence when the analyzed voice has been classified as the first voice, and generate a second output sentence in which information is omitted as compared to the first output sentence as the output sentence when the analyzed voice has been classified as the second voice.

5 Claims, 6 Drawing Sheets

(51) Int. Cl.
*G10L 15/22* (2006.01)
*G06F 3/16* (2006.01)
*G10L 25/51* (2013.01)
*G10L 15/18* (2013.01)
*G10L 15/16* (2006.01)
*G10L 15/08* (2006.01)
*G10L 15/183* (2013.01)

(52) U.S. Cl.
CPC ........ *G10L 25/51* (2013.01); *G10L 2015/227* (2013.01); *G10L 2015/228* (2013.01)

(58) Field of Classification Search
CPC .. G06F 40/289; G06F 16/3329; G06F 16/337; G06F 40/00; G06F 40/56
See application file for complete search history.

(56) References Cited

U.S. PATENT DOCUMENTS

| | | | |
|---|---|---|---|
| 2016/0379638 A1* | 12/2016 | Basye | G10L 15/18 704/235 |
| 2017/0083281 A1* | 3/2017 | Shin | G10L 13/033 |
| 2017/0110129 A1* | 4/2017 | Gelfenbeyn | G06F 3/167 |
| 2017/0160813 A1* | 6/2017 | Divakaran | G06K 9/00221 |
| 2019/0130900 A1* | 5/2019 | Tsai | G10L 15/22 |
| 2019/0139541 A1* | 5/2019 | Andersen | G10L 15/16 |
| 2019/0164554 A1* | 5/2019 | Huang | G06F 16/3329 |
| 2019/0180740 A1* | 6/2019 | Nandy | G10L 15/30 |
| 2019/0266999 A1* | 8/2019 | Chandrasekaran | G09B 5/00 |

* cited by examiner

| INTENTION INFORMATION I | ATTRIBUTE PARAMETER E0/ ATTRIBUTE CONTENT E1 | ATTRIBUTE PARAMETER E0/ ATTRIBUTE CONTENT E1 |
|---|---|---|
| WEATHER | DATE | LOCATION |
| | DAY Z OF MONTH Y OF YEAR X | TOKYO |

FIG.4

| INTENTION INFORMATION I | ACQUISITION PARAMETER A0/ ACQUISITION CONTENT INFORMATION A1 | ACQUISITION PARAMETER A0/ ACQUISITION CONTENT INFORMATION A1 | ACQUISITION PARAMETER A0/ ACQUISITION CONTENT INFORMATION A1 |
|---|---|---|---|
| WEATHER | WEATHER | AIR TEMPERATURE | CHANCE OF RAINFALL |
| | PARTLY CLOUDY | HIGHEST AIR TEMPERATURE: 25 DEGREES LOWEST AIR TEMPERATURE: 15 DEGREES | 20% |

VOICE-CONTENT CONTROL DEVICE, VOICE-CONTENT CONTROL METHOD, AND NON-TRANSITORY STORAGE MEDIUM

CROSS-REFERENCE TO RELATED APPLICATION

This application claims priority from Japanese Application No. 2018-039754, filed on Mar. 6, 2018, the contents of which are incorporated by reference herein in its entirety.

FIELD

The present application relates to a voice-content control device, a voice-content control method, and a non-transitory storage medium.

BACKGROUND

As disclosed in Japanese Examined Patent Publication No. H07-109560, for example, a voice control device that analyzes detected voice of a user and performs processing according to the user's intention has been proposed. Furthermore, a voice control device, which outputs, via voice, that processing intended by a user has been performed, or outputs, via voice-content of a user's inquiry, has also been proposed.

However, when a voice processing device that outputs voice is used, the output voice may be heard by a person who is not the user of the voice processing device and is around the voice processing device. For example, if a person around the voice processing device is asleep, the output voice may be an annoyance to the person. In that case, the output voice itself may be decreased in sound volume, but if the output voice is decreased in sound volume too much, the output voice may be hard to be heard by the user himself and the user may be unable to understand the content of the voice. Therefore, on outputting the voice to the user, influence of the output voice to people other than the user is desired to be suppressed, and content of the output voice to the user is desired to be made adequately understandable.

SUMMARY

A voice-content control device, a voice-content control method, and a non-transitory storage medium are disclosed.

According to one aspect, there is provided a voice-content control device, comprising: a voice classifying unit configured to analyze a voice spoken by a user and acquired by a voice acquiring unit to classify the voice as either one of a first voice or a second voice; a process executing unit configured to analyze the voice acquired by the voice acquiring unit to execute processing required by the user; and a voice-content generating unit configured to generate, based on content of the processing executed by the process executing unit, output sentence that is text data for a voice to be output to the user, wherein the voice-content generating unit is further configured to generate a first output sentence as the output sentence when the acquired voice has been classified as the first voice, and generate a second output sentence in which information is omitted as compared to the first output sentence as the output sentence when the acquired voice has been classified as the second voice.

According to one aspect, there is provided a voice-content control method, comprising: acquiring a voice spoken by a user; analyzing the acquired voice to classify the acquired voice as either one of a first voice and a second voice; analyzing the acquired voice to execute processing intended by the user; and generating, based on content of the executed processing, output sentence that is text data for a voice to be output to the user, wherein at the generating, a first output sentence is generated as the output sentence when the acquired voice has been classified as the first voice, and a second output sentence is generated as the output sentence in which a part of information included in the first output sentence is omitted when the acquired voice has been classified as the second voice.

According to one aspect, there is provided a non-transitory storage medium that stores a voice-content control program that causes a computer to execute: acquiring a voice spoken by a user; analyzing the acquired voice to classify the acquired voice as either one of a first voice and a second voice; analyzing the acquired voice to execute processing intended by the user; and generating, based on content of the executed processing, output sentence that is text data for a voice to be output to the user, wherein at the generating, a first output sentence is generated as the output sentence when the acquired voice has been classified as the first voice, and a second output sentence is generated as the output sentence in which a part of information included in the first output sentence is omitted when the acquired voice has been classified as the second voice.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMNODIMENTS

Embodiments of the present application are explained in detail below with reference to the drawings. The embodiments explained below are not intended to limit the present application.

First Embodiment

Figure 1:
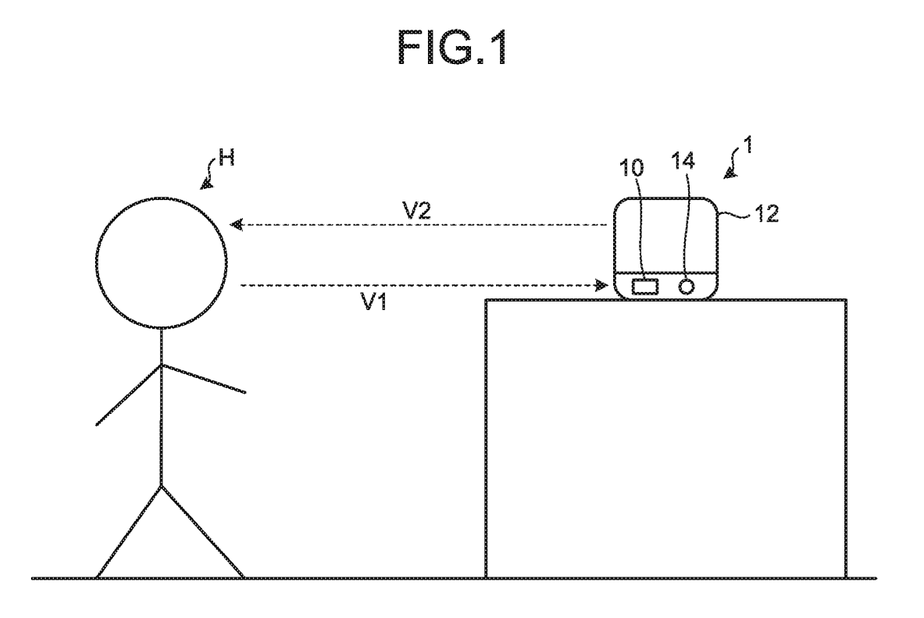
FIG. 1 is a schematic diagram of a voice-content control device according to a first embodiment.

First, a first embodiment is explained. FIG. 1 is a schematic diagram of a voice-content control device according to the first embodiment. As shown in FIG. 1, a voice-content control device 1 according to the first embodiment detects a voice V1 spoken by a user H by a voice detecting unit 10, analyzes the detected voice V1 to perform a predetermined processing, and outputs a voice V2 by a voice output unit 12. Although the voice V2 is output toward the user H, when other people are present around the voice-content control device 1, the voice V2 can be heard by the people. If, for example, a person around the voice-content control device 1 is asleep, the voice V2 may be an annoyance to the person. The voice-content control device 1 according to this embodiment analyzes the voice V1, and adjusts text to be output as the voice V2, thereby suppressing influence of the voice V2 on people other than the user H and allowing the user H to adequately understand content of the voice V2.

Figure 2:
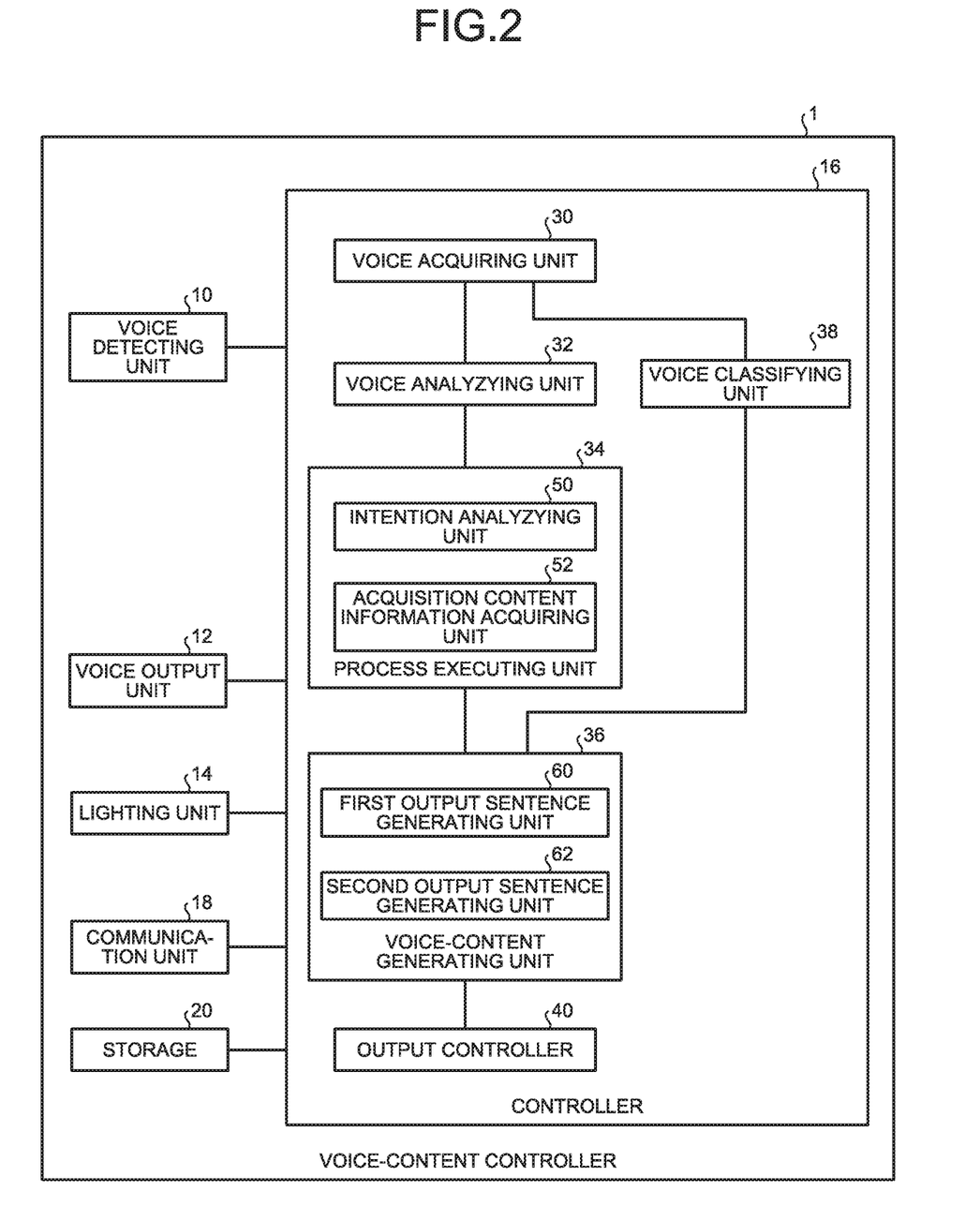
FIG. 2 is a schematic block diagram of the voice-content control device according to the first embodiment.

FIG. 2 is a schematic block diagram of the voice-content control device according to the first embodiment. As shown in FIG. 2, the output-content control device 1 includes the voice detecting unit 10, the voice output unit 12, a lighting unit 14, a controller 16, a communication unit 18, and a storage 20. The voice-content control device 1 is a so-called smart speaker (artificial intelligence (AI) speaker), but is not limited thereto as long as the device has functions described later. The voice-content control device 1 can be, for example, a smart phone, a tablet, and the like.

The voice detecting unit 10 is a microphone and detects the voice V1 spoken by the user H. The user H speaks the voice V1 toward the voice detecting unit 10 so as to include information for a processing wished to be performed by the voice-content control device 1. The voice detecting unit 10 can be regarded as an input unit that accepts information input externally. The input unit may be provided in addition to the voice detecting unit 10, and, for example, a switch to adjust volume of the voice V2 by operation performed by the user H, and the like may be provided. The voice output unit 12 is a speaker, and outputs sentences (output sentences described later) generated by the controller 16 as the voice V2. The lighting unit 14 is a light source, such as a light emitting diode (LED), and is turned on by a control of the controller 16. The communication unit 18 is a mechanism to communicate with external servers, such as a Wi-Fi (registered trademark) module and an antenna, and communicates information with an external server not shown under control of the controller 16. The communication unit 18 performs communication of information with the external servers by wireless communication such as Wi-Fi, but the communication of information with the external servers may be performed also by wired communication by cables connected. The storage 20 is a memory that stores information on arithmetic calculation of the controller 16 or programs, and includes, for example, at least one of a random access memory (RAM), a read-only memory (ROM), and an external storage device, such as a flash memory.

The controller 16 is an arithmetic unit, namely, a central processor (CPU). The controller 16 includes a voice acquiring unit 30, a voice analyzing unit 32, a process executing unit 34, a voice-content generating unit 36, a voice classifying unit 38, and an output controller 40. The voice acquiring unit 30, the voice analyzing unit 32, the process executing unit 34, the voice-content generating unit 36, the voice classifying unit 38, and the output controller 40 perform processes described later by reading software/program stored in the storage 20.

The voice acquiring unit 30 acquires the voice V1 that is detected by the voice detecting unit 10. The voice analyzing unit 32 performs voice analysis of the voice V1 acquired by the voice acquiring unit 30, to convert the voice V1 into text data. The text data is character data/text data that includes a sentence spoken as the voice V1. The voice analyzing unit 32 detects, for example, voice waveform comprising amplitude and wave length per time from the voice V1. The voice analyzing unit 32 then replaces the voice waveform per time with characters based on a table in which a relationship between the voice waveforms and the characters is stored, thereby converting the voice V1 into the text data. Note that the converting method can be arbitrarily chosen as long as it enables to convert the voice V1 into the text data.

Based on the text data generated by the voice analyzing unit 32, the process executing unit 34 detects information on content of processing that is included in the voice V1 and desired to be executed by the voice-content control device 1, and executes the processing. The process executing unit 34 has an intention analyzing unit 50, and an acquisition content information acquiring unit 52.

The intention analyzing unit 50 acquires the text data that is generated by the voice analyzing unit 32, extracts intention information I based on the text data, and extracts the attribute information E based on the intention information I. The attribute information E is information that is associated with the intention information I, and is information that indicates a condition necessary for acquiring information that the user H wishes to acquire. Namely, the attribute information E is an entity.

Firstly, processing for extracting the intent information I will be described. The intention information I, that is, an intent, is information that indicates what kind of processing is intended by the user H to be performed on the voice-content control device 1. In other words, the intention information I is information that indicates what kind of processing is required by the user H to be performed on the voice-content control device 1. The intention analyzing unit 50 extracts the intention information I from the text data by using, for example, a natural language processing. In the present embodiment, the intention analyzing unit 50 extracts the intention information I from the text data based on multiple pieces of training data stored in the storage 20. The training data herein is data in which the intention information I has been assigned to the text data in advance. That is, the intention analyzing unit 50 extracts the training data that is similar to the text data generated by the voice analyzing unit 32, and regards the intention information I of the extracted training data as the intention information I of the text data generated by the voice analyzing unit 32. Note that the training data is not necessarily required to be stored in the storage 20, and the intention analyzing unit 50 can search for the training data in the external server by controlling the communication unit 18. As long as the intention analyzing unit 50 extracts the intention information I from text data, the extracting method of the intention information I can be arbitrarily chosen. For example, the intention analyzing unit 50 can read a relationship table of keywords and the intention information I stored in the storage 20, and can extract the intention information I that is associated with the keyword when the keyword in the relationship table is included in the text data.

For example, if the text data corresponds to text "How's the weather today?", by performing the above described analysis, the intention analyzing unit 50 recognizes that processing of notifying the user H of weather information is information on the processing required by the user H, that is, the intention information I. Furthermore, if, for example, the text data corresponds to text "Turn on the light.", by performing the above described analysis, the intention analyzing unit 50 recognizes that processing of turning power of the light on is information on the processing required by the user H, that is, the intention information I. As described above, the intention information I is classified into information for notification of the required information, and information for control of devices as being required.

The extracting method of the intention information I using text data can be arbitrarily chosen, not limited thereto. For example, the output-content control device 1 can be configured to store a relationship table of keywords and the intention information I in the storage 20, and to detect the intention information I associated with the keyword when the keyword is included in text data of the voice V1 spoken by the user H. As an example of this case, a keyword "konnichiwa" may be associated with weather information and news. In this case, when the user H speaks the voice V1 "konnichiwa", the intention analyzing unit 50 detects the weather information and the news as the intention information I.

Figure 3:
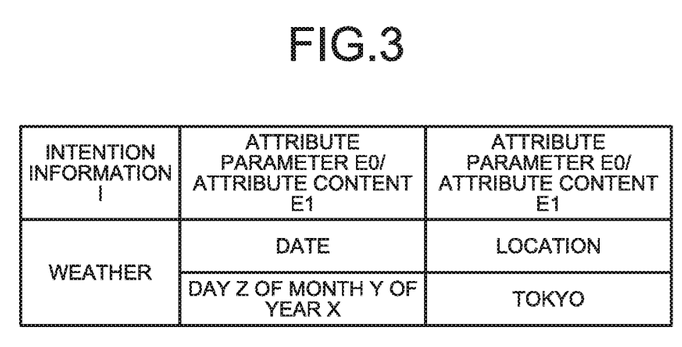
FIG. 3 is a table illustrating an example of attribute information.

Described next is the attribute information E. FIG. 3 is a table illustrating an example of the attribute information. The attribute information E, that is, the entity, is a condition needed upon execution of the processing, which is required by the user H and is extracted as the intention information I, that is, a parameter. For example, if the intention information I is weather information, the attribute information E includes information on a location indicating where the weather information is on, and information on a date indicating when the weather information is for. Furthermore, as illustrated in FIG. 3, the attribute information E includes an attribute parameter E0 and attribute content E1. The attribute parameter E0 is information indicating the type of parameter, that is, the kind of condition, and the attribute content E1 indicates content of the attribute parameter E0. That is, if the attribute information E is information on a location, the attribute parameter E0 is information indicating that the condition is the location, and the attribute content E1 is information indicating that the location is Tokyo. Moreover, if the attribute information E is information on a date, the attribute parameter E0 is information indicating that the condition is the date, and the attribute content E1 is information indicating that the date is the day Z of the month Y of the year X.

According to this embodiment, the intention analyzing unit 50 extracts the attribute information E, based on the extracted intention information I. More specifically, the intention analyzing unit 50 selects and extracts the attribute parameter E0 from the extracted intention information I. The intention analyzing unit 50 reads out a relation table between the intention information I and the attribute parameters E0 stored in the storage 20, and detects, from the relation table, the intention information I matched with the extracted intention information I. The intention analyzing unit 50 then extracts the attribute parameter E0 associated with the matched intention information I. However, the intention analyzing unit 50 may communicate with an external server via the communication unit 18, and acquire the relation table from the external server.

After the intention analyzing unit 50 has extracted attribute parameters E0, the intention analyzing unit 50 sets the attribute content E1 for each of the attribute parameters E0. The intention analyzing unit 50 extracts the attribute content E1 from, for example, the text data generated by the voice analyzing unit 32. That is, if a keyword "today" is included in the text data, the intention analyzing unit 50 sets the attribute content E1 of the attribute parameter E0, the date, to today. Furthermore, the intention analyzing unit 50 may set the attribute content E1 for the attribute parameter E0 in advance. For example, if the intention information I is weather information, set data indicating that the attribute content E1 of the location is Tokyo may be stored in the storage 20 in advance. Accordingly, even if a keyword indicating the location is not included in the text data, the intention analyzing unit 50 is able to set the attribute content E1 of the location to Tokyo. Furthermore, the intention analyzing unit 50 may set the attribute content E1 by communicating with the external server through the communication unit 18. In this case, for example, the intention analyzing unit 50 acquires the current location by communication with a global positioning system (GPS), and sets the location as the attribute content E1.

The intention analyzing unit 50 extracts the intention information I and the attribute information E as described above, but without being limited thereto. Any extraction methods for the intention information I and attribute information E may be used. FIG. 3 illustrates a case where the weather information is the intention information I, but the intention information I and attribute information E are able to be extracted similarly in other cases. For example, if information indicating that the power of the light is to be turned on is the intention information I, the attribute information E includes information on the location of the light, and information on the date and time when the power is to be turned on.

The acquisition content information acquiring unit 52 illustrated in FIG. 2 executes, based on content of the intention information I, processing required by the user. If the intention information I indicates that a device is to be controlled, the acquisition content information acquiring unit 52 executes processing of content of the intention information I. For example, the acquisition content information acquiring unit 52 turns the power of the light at the location indicated by the attribute information E on.

Figure 4:
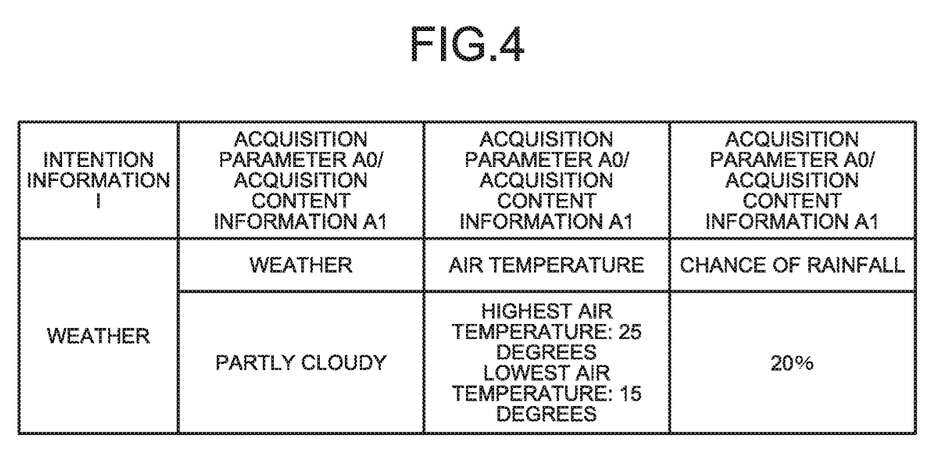
FIG. 4 is a table illustrating acquisition information.

FIG. 4 is a table illustrating acquisition information. If the intention information I indicates notification of required information, the acquisition content information acquiring unit 52 acquires the required information, that is, acquisition information A. The acquisition information A is information that the user H is to be notified of, and is, in other words, information determined by the process executing unit 34 to be information that the user H requires to be notified of. Based on the intention information I extracted by the intention analyzing unit 50, the acquisition content information acquiring unit 52 acquires the acquisition information A. More specifically, the acquisition content information acquiring unit 52 selects and extracts acquisition parameter A0 from the extracted intention information I. The acquisition content information acquiring unit 52 reads out a relation table between the intention information I and the acquisition parameters A0 stored in the storage 20, and detects, from the relation table, the intention information I matched with the extracted intention information I. The acquisition content information acquiring unit 52 then extracts the attribute parameter A0 associated with the matched intention information I. However, the acquisition content information acquiring unit 52 may communicate with the external server via the communication unit 18, and acquire the relation table from the external server.

After having extracted the acquisition parameters A0, the acquisition content information acquiring unit 52 acquires, based on the attribute information E, acquisition content information A1 for each of the acquisition parameters A0. Specifically, for each of the acquisition parameters A0, the acquisition content information acquiring unit 52 acquires the acquisition content information A1 corresponding to the attribute content E1 set for that attribute parameter E0. By communicating with the external server/external device via the communication unit 18, the acquisition content information acquiring unit 52 acquires the acquisition content information A1 from the external server for each of the acquisition parameters A0. However, if the acquisition content information A1 has been stored in the storage 20, the acquisition content information acquiring unit 52 may acquire the acquisition content information A1 from the storage 20. That is, the acquisition content information A1 can be said to be data that the acquisition content information acquiring unit 52 acquires from a database of the external server, the storage 20, or the like.

As described above, the acquisition content information A1 is information that the acquisition content information acquiring unit 52 has acquired by the communication with the external server, or read-out from the storage 20. In the example of FIG. 4, the intention information I is weather, and the acquisition parameters A0 are weather, air temperature, and chance of rainfall. In this case, the acquisition content information acquiring unit 52 acquires the acquisition content information A1 for the respective acquisition parameters A0, that is, weather, air temperature, and chance of rainfall, in Tokyo, on the day Z of the month Y of the year X. In the example of FIG. 4, the acquisition content information A1 for weather is "partly cloudy", the acquisition content information A1 for air temperature is "highest air temperature: 25 degrees; lowest air temperature: 15 degrees", and the acquisition content information A1 for chance of rainfall is "20%".

As described above, the acquisition content information acquiring unit 52 acquires, based on the attribute information E, the acquisition content information A1 for each of the acquisition parameter A0. According to this embodiment, multiple acquisition parameters A0 are associated with the intention information I. However, one acquisition parameter A0 may be associated with the intention information I. In this case, the intention information I itself can be said to be the acquisition parameter A0.

Referring back to FIG. 2, the voice-content generating unit 36 generates the output sentence based on the acquisition content information A1 acquired by the acquisition content information acquiring unit 52. The output sentence is data of the sentence for the voice V2 to be output by the voice output unit 12, that is, text data. It can be said that the output sentence is dialog data. The voice-content generating unit 36 includes a first output sentence generating unit 60 that generates a first output sentence as the output sentence, and a second output sentence generating unit 62 that generates a second output sentence as the output sentence. The voice classifying unit 38 is explained before explaining of the first output sentence generating unit 60 and the second output sentence generating unit 62.

The voice classifying unit 38 analyzes the voice V1 acquired by the voice acquiring unit 30, and classifies the voice V1 to either one of a first voice V1A and a second voice V1B. In the present embodiment, the voice classifying unit 38 classifies the voice V1 to the second voice V1B when the voice V1 is determined to be a whisper as a result of analysis. The voice classifying unit 38 classifies the voice V1 to the first voice V1A when the voice V1 is determined not to be a whisper. A whisper is an unvoiced voice spoken without vibrating the vocal chords, but it is not limited to the unvoiced voice spoken without vibrating the vocal chords as long as it is classified to the second voice V1B by, for example, a method described later.

For example, the voice classifying unit 38 acquires a time waveform of intensity of the voice V1, and performs Fourier-transformation on the time waveform, thereby acquiring a spectrum that indicates intensity of the voice V1 per frequency. The voice classifying unit 38 classifies the voice V1 as either one of the first voice V1A or the second voice V1B by using a peak frequency that is equal to or higher than a predetermined intensity in the spectrum as a feature value. For example, the voice classifying unit 38 determines the voice as a whisper to classify to the second voice V1B when the peak frequency is equal to or lower than the threshold, and determines the voice as not a whisper to classify to the first voice V1A when the peak frequency is larger than the threshold. Note that the voice classifying unit 38 can perform the classification to the first voice V1A and the second voice V1B by using any method. For example, the voice classifying unit 38 can perform the classification to the first voice V1A and the second voice V1B by using a slope of the peak in the spectrum as a feature value. Moreover, the voice classifying unit 38 can perform the classification to the first voice V1A and the second voice V1B by using either one of a volume of the voice V1, a speaking speed of the user in the voice V1, and a volume ratio between a speech of the user and a wind noise as a feature value. Furthermore, a proximity sensor can be provided in the voice-content control device 1, a distance between the user H and the voice-content control device 1 is calculated from a detection result of the proximity sensor, and the distance can be used as a feature value to perform the classification to the first voice V1A and the second voice V1B. Moreover, the voice classifying unit 38 can derive a Mel-frequency cepstrum coefficient as a feature value, and can perform the classification to the first voice V1A and the second voice V1B based on the mel-frequency cepstrum coefficient. In these cases, the voice classifying unit 38 sets a threshold of the feature value, and classifies the voice V1 as either one of the first voice V1A or the second voice V1B based on whether the feature value exceeds the threshold.

As described above, the voice classifying unit 38 classifies the voice V1 by using the voice V1 acquired by the voice acquiring unit 30. That is, the voice classifying unit 38 classifies the voice V1 to the second voice V1B when the voice V1 is a whisper, and to the first voice V1A when the voice V1 is not a whisper even when meaning of the voice V1 is the same.

Moreover, the voice classifying unit 38 is not limited to perform the classification to the first voice V1A and the second voice V1B, using the voice V1. The classification can be performed by generating text data of the voice V1 by performing character analysis of the voice V1 acquired by the voice acquiring unit 30, and by using the text data of the voice V1. For example, the voice classifying unit 38 can classify the voice V1 not by judging whether the voice is a whisper, but based on a keyword included in the voice V1. That is, the voice classifying unit 38 can classify the voice V1 to the second voice V1B when a keyword stored in the storage 20 is included in the voice V1, and to the first voice V1A when the keyword stored in the storage 20 is not included in the voice V1.

The voice classifying unit 38 can use either one of the classification methods explained above, or can perform the classification by combining the classification methods explained above.

The voice-content generating unit 36 causes the first output-sentence-generating unit 60 to generate the first output sentence when the voice classifying unit 38 classifies the voice V1 to the first voice V1A. That is, the voice-content generating unit 36 generates the first output sentence, not generating the second output sentence when the voice V1 is classified to the first voice V1A. The first output-sentence-generating unit 60 generates a sentence that includes all pieces of information of the intention information I, the attribute information E (the attribute content information E1), and the acquisition information A, which are acquired by the process executing unit 34, as the first output sentence. That is, the first output sentence is text data that includes all of the intention information I, the attribute content information E1, and the acquisition information A acquired by the process executing unit 34.

In the example of FIG. 3 and FIG. 4, the intention information I is "weather", and the attribute content E1 is "the day Z of the month Y of the year X" and "Tokyo". In the acquisition information A, the acquisition parameters A0 are "weather", "air temperature", and "chance of rainfall", and the acquisition content information A1 is "partly cloudy", "highest air temperature: 25 degrees; lowest air temperature: 15 degrees", and "20%". In this case, the first output sentence generating unit 60 generates, as the first output sentence "On the day Z of the month Y of the year X, in Tokyo, the weather is partly cloudy, the chance of rainfall is 20%, the highest air temperature is 25 degrees, and the lowest air temperature is 15 degrees", for example. The intention information I, the attribute content E1, and the acquisition information A are each separate information. The first output sentence generating unit 60 has added information in the first output sentence, such that the first output sentence is formed into sentence including the intention information I, the attribute content E1, and the acquisition information A. That is, the first output sentence generating unit 60 has added information (a word or words) other than the intention information I, the attribute content E1, and the acquisition information A, in the first output sentence. This added information (word) may be, if the first output sentence is in Japanese, a polite Japanese expression such as "desu", or a Japanese postpositional particle "ha" and may be, if the first output sentence is in English, an article or the like. Hereinafter, this added information will be referred to as sentence information.

When the voice V1 has been classified as the second voice V1B by the voice classifying unit 38, the voice-content generating unit 36 causes the second output sentence generating unit 62 to generate the second output sentence. That is, if the voice V1 has been classified as the second voice V1B, the voice-content generating unit 36 generates the second output sentence without generating the first output sentence. The second output sentence generating unit 62 generates the second output sentence by generating sentence such that a part of information is omitted, as compared to the first output sentence. Therefore, an amount of sentence of the second output sentence is less than that of the first output sentence. In other words, if the first output sentence and the second output sentence were to be generated based on the same intention information I, attribute information E, and acquisition information A, the amount of sentence of the second output sentence would be less than that of the first output sentence because information included in the second output sentence would be omitted as compared to the first output sentence.

Specifically, the second output sentence generating unit 62 generates the second output sentence such that the second output sentence does not include at least one of the intention information I, the attribute content E1, the acquisition information A, and the sentence information that is added when the first output sentence is generated, the intention information I, attribute content E1, and acquisition information A having been acquired by the process executing unit 34. In other words, if the first output sentence were to be generated based on the same intention information I, attribute information E, and acquisition information A, the second output sentence generating unit 62 would generate the second output sentence by omitting at least one of the intention information I, the attribute content E1, the acquisition information A. and the sentence information all included in the first output sentence.

If the intention information I is not to be included in the second output sentence, that is, if the intention information I is to be omitted, for example, "weather", which is the intention information I, will be omitted, and the second output sentence will be "On the day Z of the month Y of the year X, Tokyo is partly cloudy, the chance of rainfall is 20%, the highest air temperature is 25 degrees, and the lowest air temperature is 15 degrees". Since the intention information I is a type of information that the user H wishes to ask for, the user H is able to understand the content even if the intention information I is omitted.

Furthermore, if the attribute content E1 is not to be included in the second output sentence, that is, if the attribute content E1 is to be omitted, for example, "the day Z of the month Y of the year X" and "Tokyo", which are the attribute content E1, will be omitted, and the second output sentence will be "The weather is partly cloudy, the chance of rainfall is 20%, the highest air temperature is 25 degrees, and the lowest air temperature is 15 degrees". Since the user H has normally included the attribute content E1 in the voice V1 the user H is able to understand the content even if the attribute content E1 is omitted. In other words, the second output sentence generating unit 62 may select information included in the voice V1 as omitted information, that is, information not to be included in the second output sentence. That is, the second output sentence generating unit 62 determines information included in the voice V1 spoken by the user H as a part of information to be omitted. Further, even if the attribute content E1 is not included in the voice V1, the attribute content E1 may have been stored as the set data in the storage 20. In this case, since the user H is aware that the attribute content E1 is the set data, that is, the attribute content E1 has been set as default data, the user H is able to understand the content even if the attribute content E1 is not included in the voice V1. If there are multiple types of the attribute content E1, the second output sentence generating unit 62 may omit all of the types of attribute content E1 or may omit a part of the types of attribute content E1.

Furthermore, if the sentence information is to be not included in the second output sentence, that is, if the text information is to be omitted, for example, a word/words that is/are the sentence information will be omitted, and the second output sentence will be "On day Z of month Y of year X, in Tokyo, weather partly cloudy, chance of rainfall 20%, highest air temperature 25 degrees, and lowest air temperature 15 degrees". That is, if the second output sentence is in Japanese, for example, the polite Japanese expression will be omitted as the sentence information, and if the second output sentence is in English, the articles will be omitted.

The acquisition information A, on the other hand, is information that the user H wishes to ask for, and is thus desirably not omitted, as compared to the intention information I, the attribute content E1, and the sentence information. In particular, since the acquisition content information A1 is data themselves to be provided to the user H, the acquisition content information A1 is desirably not omitted. That is, desirably, the second output sentence generating unit 62 generates the second output sentence by selecting information to be omitted from information excluding the acquisition content information A1. In other words, desirably, without selecting the acquisition content information A1 as information to be omitted, the second output sentence generating unit 62 includes the acquisition content information A1 in the second output sentence. Accordingly, by selecting information not to be included in the second output sentence, from information excluding the acquisition content information A1, and not selecting the acquisition content information A1 as the information to be not included the second output sentence, the second output sentence generating unit 62 enables the user H to understand the content, and the amount of sentence to be adequately reduced.

However, the second output sentence generating unit 62 may omit the acquisition information A, and such a case will be described hereinafter. For example, the second output sentence generating unit 62 may select the acquisition parameters A0 of the acquisition information A, as information to be omitted. In this case, "weather", "chance of rainfall", and "air temperature (highest air temperature and lowest air temperature)", which are all the acquisition parameters A0, will be omitted, and the second output sentence will be "On the day Z of the month Y of the year X, Tokyo is partly cloudy, 20%, and 15 degrees to 25 degrees.". Since the acquisition parameters A0 are information associated with the acquisition content information A1 that the user H wishes to ask for, when the user H is notified of the acquisition content information A1, the user H is able to recognize each of the parameters A0 corresponding to each of the acquisition content information A1.

More specifically, if the acquisition content information A1 is numerical information including a unit, the second output sentence generating unit 62 selects, as information to be omitted, the acquisition parameter A0 associated with the acquisition content information A1, that is, information indicating type of the numerical information. When the acquisition content information A1 includes a unit, the user H is able to recognize the acquisition parameter A0 from that unit.

Furthermore, if the acquisition content information A1 is information indicating a numerical range, the second output sentence generating unit 62 selects, as information to be omitted, the acquisition parameter A0 associated with the acquisition content information A1. The acquisition parameter A0 to be omitted in this case is information indicating the highest value in the numerical range ("highest air temperature" in this example), and information indicating the lowest value in the numerical range ("lowest air temperature" in this example).

Furthermore, if the acquisition content information A1 is information indicating start and end, the second output sentence generating unit 62 selects, as information to be omitted, the acquisition parameters A0 associated with the acquisition content information A1. The information indicating start and end is, for example, information for a case where a departure station is Tokyo Station and an arrival station is Yokohama Station. In this case, Tokyo Station is information indicating the start, and Yokohama Station is information indicating the end. In this case, for example, the first output sentence will be "The departure station is Tokyo Station and the arrival station is Yokohama Station.", while the second output sentence will be "It will be from Tokyo Station to Yokohama Station." by omission of "departure station" and "arrival station", which are the acquisition parameters A0. That is, in this case, it can be said that "departure station" that is an acquisition parameter A0 is information corresponding to the start in the acquisition content information A1, and "arrival station" that is another acquisition parameter A0 is information corresponding to the end is the end in the acquisition content information A1. In the above described case also, since the second output sentence includes "from A to B" as the acquisition content information A1, the user H is able to understand the content even if the acquisition parameters A0 is omitted.

Furthermore, if multiple types of the intention information I or multiple types of the acquisition content information A1 have been acquired, the second output sentence generating unit 62 may select, as information to be omitted, a part of the multiple types of acquisition content information A1. For example, if the multiple types of intention information I have been extracted, the second output sentence generating unit 62 omits the acquisition content information A1 belonging to one of the types of intention information I. For example, the second output sentence generating unit 62 omits, as the information of low priority, the acquisition content information A1 of the type of the intention information I the amount of which, on being generated as the sentence, would become large. For example, described below is a case where it has been set such that weather and news are extracted as types of the intention information I when the voice V1 is "Good morning." In this case, when the output sentence related to the news would be longer in length than the output sentence related to the weather, the second output sentence generating unit 62 omits the acquisition content information A1 related to the news, and leaves the acquisition content information A1 related to the weather.

Furthermore, when multiple types of the acquisition content information A1 have been acquired for one type of the intention information I, the second output sentence generating unit 62 may also omit one of the multiple types of the acquisition content information A1. For example, if the type of the intention information I is for notification of traffic jam information, the acquisition content information A1 will be pieces of traffic jam information for different locations. In this case, the second output sentence generating unit 62 omits, as a piece of information of low priority, pieces of traffic jam information of low importance (acquisition content information A1), such as, for example, pieces of traffic jam information for locations far from the current position, or pieces of traffic jam information for locations in which degree of traffic jam is small.

Accordingly, when there are multiple types of the acquisition content information A1, and a part of the multiple types of the acquisition content information A1 is to be omitted, the second output sentence generating unit 62 selects, as information to be omitted, a type of the acquisition content information A1 of low priority. Priority levels are set and stored in the storage 20 in advance, and the second output sentence generating unit 62 selects, based on the stored priority levels, a type of the acquisition content information A1 of low priority. That is, for example, the small amount of the sentence may be determined to be high priority, or traffic jam information for a location close to the current position may be determined to be high priority, and these priority levels are stored.

As described above, the second output sentence generating unit 62 generates the second output sentence by omitting at least one of the intention information I, the attribute content E1, the acquisition information A, and the sentence information. That is, the intention information I, the attribute content E1, the acquisition information A, and the sentence information can be said to be omittable information. The second output sentence generating unit 62 may select all of the above described omittable information as the information to be omitted, or may omit only a part of the omittable information. For example, the voice-content control device presets information to be actually omitted among the omittable information. For example, if the intention information I and the attribute content E1 have been set as the information to be omitted, the second output sentence generating unit 62 will always omit the intention information I and the attribute content E1 on generating the second output sentence, regardless of the type of the intention information I and attribute content E1. Furthermore, the voice-content control device 1 may have a table stored in the storage 20 in advance, the table indicating the types of the information to be actually omitted. In this case, since, for example, the intention information I to be omitted (for example, weather) will be distinguished from the information not to be omitted (for example, time), the information to be omitted is able to be appropriately selected according to the type of the information.

The voice-content generating unit 36 generates the output sentence as described below. The above description is on a generation method for the output sentence in a case where the intention information I is a content indicating the notification of the information. In a case where the intention information I is a content indicating control of a device, the voice-content generating unit 36 generates the second output sentence similarly such that the information is omitted in the second output sentence as compared to first output sentence. In this case, after execution of control by the acquisition content information acquiring unit 52 (for example, control of turning the power of the light on), the voice-content generating unit 36 generates, as the output sentence, sentence explaining the execution state of that control. More specifically, if the voice V1 has been classified as the first voice V1A, the voice-content generating unit 36 generates, as the first output sentence, text data corresponding to "Yes, the processing has been accepted." That is, the first output sentence includes information for a reply such as "Yes", and information for sentence following the information for the reply such as "the processing has been accepted". On the contrary, when the voice V1 has been classified as the second voice V1B, the voice-content generating unit 36 generates, as the second output sentence, text data corresponding to "Yes". That is, in this case, the second output sentence includes information for a reply, and information for sentence following the information for the reply is omitted. Therefore, in also this case, when the voice V1 has been classified as the second voice V1B, the voice-content generating unit 36 can be said to omit a part of information that would be included in the first output sentence when the first output sentence were generated.

Referring back to FIG. 2, the output controller 40 acquires the output sentences generated by the voice-content generating unit 36, that is, the first output sentence or the second output sentence. The output controller 44 converts the output sentences in the text data into voice data, and causes the voice output unit 12 to output the voice data as the second voice V2. The output controller 40 makes a sound volume of a voice V2 for reading the first output sentence and a sound volume of the voice V2 for reading the second output sentence the same when the same sound volume has been set therefor. That is, the output controller 40 does not change the sound volume of the voice V2 between the first output sentence and the second output sentence. However, the output controller 40 may use different sound volumes for the voice V2 between the first output sentence and the second output sentence. Furthermore, the output controller 40 can control the lighting unit 14 to turn on the light when the voice V2 is output, when the processing by the acquisition content information acquiring unit 52 is completed, when the voice V1 is detected, or the like.

Figure 5:
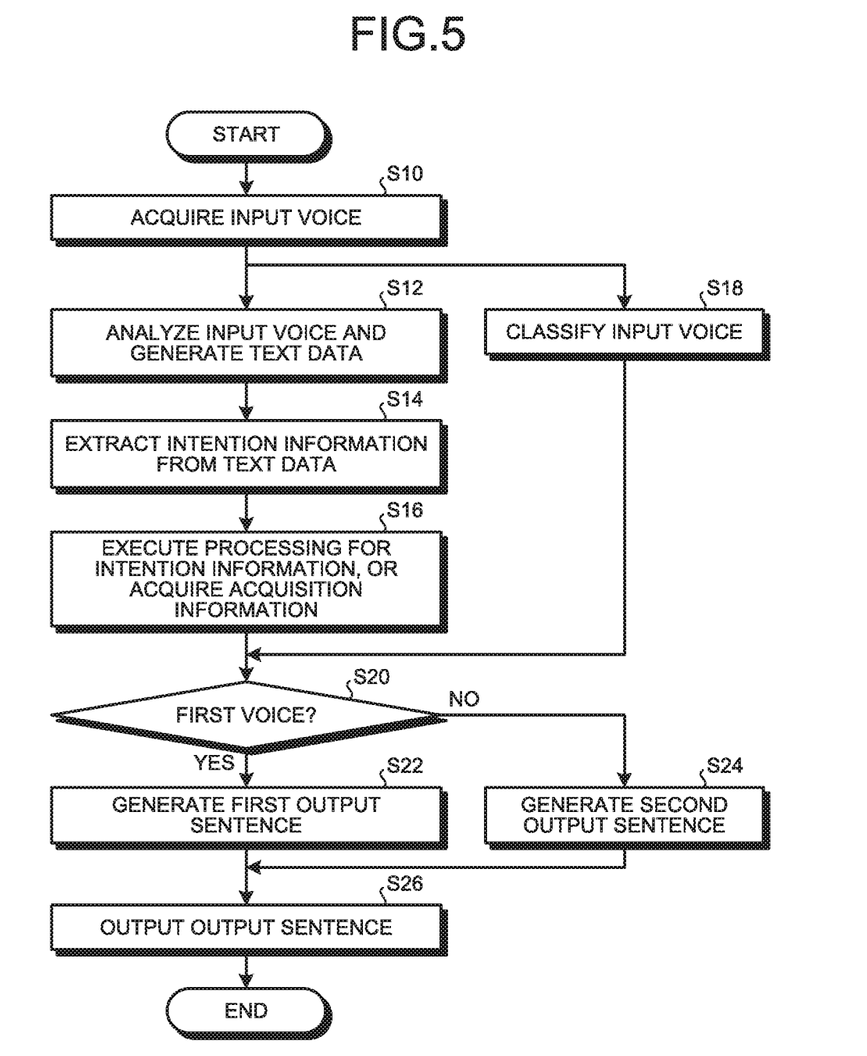
FIG. 5 is a flow chart illustrating a flow of output processing for output sentence, according to the first embodiment.

The controller 16 has a configuration as described above. A flow of output processing of the output sentence by the controller 16 is explained based on a flowchart. FIG. 5 is a flowchart showing a flow of output processing of the output sentence according to the first embodiment. As shown in FIG. 5, the controller 16 acquires the input voice, that is, the voice data of the voice V1, by the voice acquiring unit 30 (step S10). The controller 16 causes the voice analyzing unit 32 to analyze the voice data of the voice V1 acquired by the voice acquiring unit 30, and generates the text data (step S12). Subsequently, the controller 16 causes the intention analyzing unit 50 to extract the intention information I and the attribute information E from the text data (step S14). After having extracted the intention information I and the attribute information E, the controller 16 performs, through the acquisition content information acquiring unit 52, execution of processing for the intention information I or acquisition of the acquisition information for the intention information I (Step S16). That is, when the intention information I is a content indicating that a device is to be controlled, the acquisition content information acquiring unit 52 executes processing of content prescribed by the intention information I and the attribute information E (for example, turning on the power of the light). On the contrary, when the intention information I is a content indicating notification of information, the acquisition content information acquiring unit 52 acquires the acquisition information A based on the intention information I and the attribute information E. Specifically, the acquisition content information acquiring unit 52 extracts the acquisition parameters A0 based on the intention information I and the attribute information E, and acquires the acquisition content information A1 for each of the acquisition parameters A0. Furthermore, when the input voice, namely the voice V1, is acquired at step S10, the controller 16 causes the voice classifying unit 38 to classify the voice V1 as either one of the first voice V1A or the second voice V1B (step S18).

The controller 16 determines whether the voice V1 is the first voice V1A (step S20), and the voice V1 is determined to be the first voice V1A (step S20: YES), causes the first output sentence generating unit 60 to generate the first output sentence (step S22). On the other hand, when the voice V1 is determined not to be the first voice V1A (step S20: NO), that is, the voice V1 is determined to be the second voice V1B, the controller 16 causes the second output sentence generating unit 62 to generate the second output sentence (step S24). After having generated the output sentence, that is, the first output sentence or the second output sentence, the controller 16 causes the output controller 40 to output the output sentence as the voice V2 by the voice output unit 12 (step S26), and ends the processing. That is, when the first output sentence is generated, the output controller 40 converts the first output sentence into the voice data, and causes the voice output unit 12 to output it as the voice V2. When the second output sentence is generated, the output controller 40 converts the second output sentence into the voice data, and causes the voice output unit 12 to output it as the voice V2.

The voice-content control device 1 according to this embodiment has the voice classifying unit 38, the process executing unit 34, and the voice-content generating unit 36. By analyzing the voice V1 spoken by the user H and acquired by the voice acquiring unit 30, the voice classifying unit 38 classifies the voice V1 as the first voice V1A or the second voice V1B. The process executing unit 34 analyzes the voice V1 acquired by the voice acquiring unit 30, and executes the processing required by the user H. The voice-content generating unit 36 generates, based on the content of the processing executed by the process executing unit 34, the output sentence that is sentence/text data for the voice V2 to be output to the user H. When the voice V1 has been classified as the first voice V1A, the voice-content generating unit 36 generates, as the output sentence, the first output sentence. When the voice V1 has been classified as the second voice V1B, the voice-content generating unit 36 generates, as the output sentence, the second output sentence in which a part of the information is omitted as compared to the first output sentence. Furthermore, according to this embodiment, when the voice V1 has been classified as the second voice V1B, the voice-content generating unit 36 generates, as the output sentence, the second output sentence that is less in the amount of the sentence than the first output sentence by generating the sentence such that a part of the information is omitted as compared to the first output sentence.

The voice V2 output as the voice data of the output sentence is output to the user H, but as described above, the voice V2 may reach a person, other than the user H, who is around the voice-content control device 1. When the user H determines that the voice V2 is not desired to influence any person around the voice-content control device 1, the user H changes the voice V1 by, for example, uttering the voice V1 as a whispered voice, even if the same content is to be told, unlike a case where the user determines that the person may be influenced by the voice V2. When the voice V1 classified as the first voice V1A has been detected by analysis of the voice V1 of the user H, the voice-content control device 1 determines that the influence of the voice V2 on any person other than the user H does not need to be considered, and generates the first output sentence for the voice V2. On the contrary, when the voice V1 classified as the second voice V1B has been detected, the voice-content control device 1 determines that the influence of the voice V2 on any person other than the user H needs to be considered, and generates, for the voice V2, the second output sentence in which the amount of the sentence is smaller than that of the first output sentence. Thereby, when there is a need for consideration of the influence of the voice V2 on any person other than the user H, the voice-content control device 1 is able to reduce the amount of the sentence generated as the voice V2 and shorten the output length of the voice V2, thereby suppress the influence of the voice V2 on the person other than the user H. Furthermore, since the voice-content control device 1 generates the second output sentence by omitting a part of the information, the voice-content control device 1 enables the user H to adequately understand the content of the voice V2, that is, the content of the second output sentence by adjusting the omitted information.

Furthermore, the process executing unit 34 has the intention analyzing unit 50 that extracts, based on the voice V1, the intention information I indicating an intension of the user H, and the acquisition content information acquiring unit 52 that acquires, based on the intention information I, the acquisition content information A1 that the user H is to be notified of. The voice-content generating unit 36 generates, as the output sentence, the text data including the acquisition content information A1. Since the voice-content control device 1 make the acquisition content information A1 acquired based on the intention information I included in the output sentence, the information desired by the user H is able to be adequately conveyed to the user H.

Furthermore, when the voice V1 has been classified as the second voice V1B, the voice-content generating unit 36 generates the second output sentence by selecting the information to be omitted from the information excluding the acquisition content information A1. The acquisition content information A1 may refer to the information itself that is required by the user H. Since the voice-content generating unit 36 selects the information to be omitted from the information excluding the acquisition content information A1, the notification of the information is enabled without the omission of the acquisition content information A1, and the user H is able to adequately understand the content of the voice V2.

Furthermore, the voice-content generating unit 36 does not select the acquisition content information A1 as the information to be omitted, and make the acquisition content information A1 included in the second output sentence. The voice-content generating unit 36 is able to perform the notification of the information without omitting the acquisition content information A1, and allow the user H to adequately understand the content of the voice V2.

Furthermore, the voice-content generating unit 36 selects the information to be omitted from the table that has been set in advance. Since the information to be omitted is selected from the table stored in the storage 20, the voice-content control device 1 enables the omitted information to be appropriately selected and the user H to adequately understand the content of the voice V2.

Furthermore, the voice-content generating unit 36 selects, as the information to be omitted, the information included in the voice V1 spoken by the user H. Even if the information included in the voice V1 spoken by the user H is omitted, it is easy for the user H to understand the meaning. By the omission of such information included in the voice V1, the voice-content control device 1 enables the content of the voice V2 to be adequately understood, and the influence of the voice V2 on any person other than the user H to be suppressed.

Furthermore, if the acquisition content information A1 includes the numerical information including a unit, the voice-content generating unit 36 selects, as the information to be omitted, the information indicating the type of the numerical information (the acquisition parameter A0). By the omission of the acquisition parameter A0 associated with the acquisition content information A1 including the unit, the voice-content control device 1 enables the content of the voice V2 to be adequately understood, and the influence of the voice V2 on any person other than the user H to be suppressed.

When the multiple types of the acquisition content information A1 have been acquired from the process executing unit 34, the voice-content generating unit 36 selects, as the information to be omitted, the types of the acquisition content information A1 of low priority. By the omission of the type of the acquisition content information A1 of low priority, the voice-content control device 1 enables the content of the voice V2 to be adequately understood, and the influence of the voice V2 on any person other than the user H to be suppressed.

The voice-content generating unit 36 selects, as the information to be omitted, the types of the acquisition content information A1 the amount of which, on being generated as the output sentence, would become large from the multiple types of the acquisition content information A1. By the omission of the type of the acquisition content information A1 the amount of which, on being generated as the output sentence, would become large, the voice-content control device 1 enables the influence of the voice V2 on any person other than the user H to be suppressed.

The voice-content generating unit 36 determines the priority levels of the information in advance, and based on the priority levels determined in advance, selects the information to be omitted. By the determination of the priority levels in advance, the voice-content control device 1 enables the content of the voice V2 to be adequately understood, and the influence of the voice V2 on any person other than the user H to be suppressed.

When the voice V1 spoken by the user H is the whispered voice, the voice classifying unit 38 classifies the voice V1 as the second voice V2B. By detecting the whispered voice to generate the second output sentence, the voice-content control device 1 can determine whether the voice-content control device 1 is in a state of influencing any person other than the user H adequately, and suppress the influence adequately.

Figure 6:
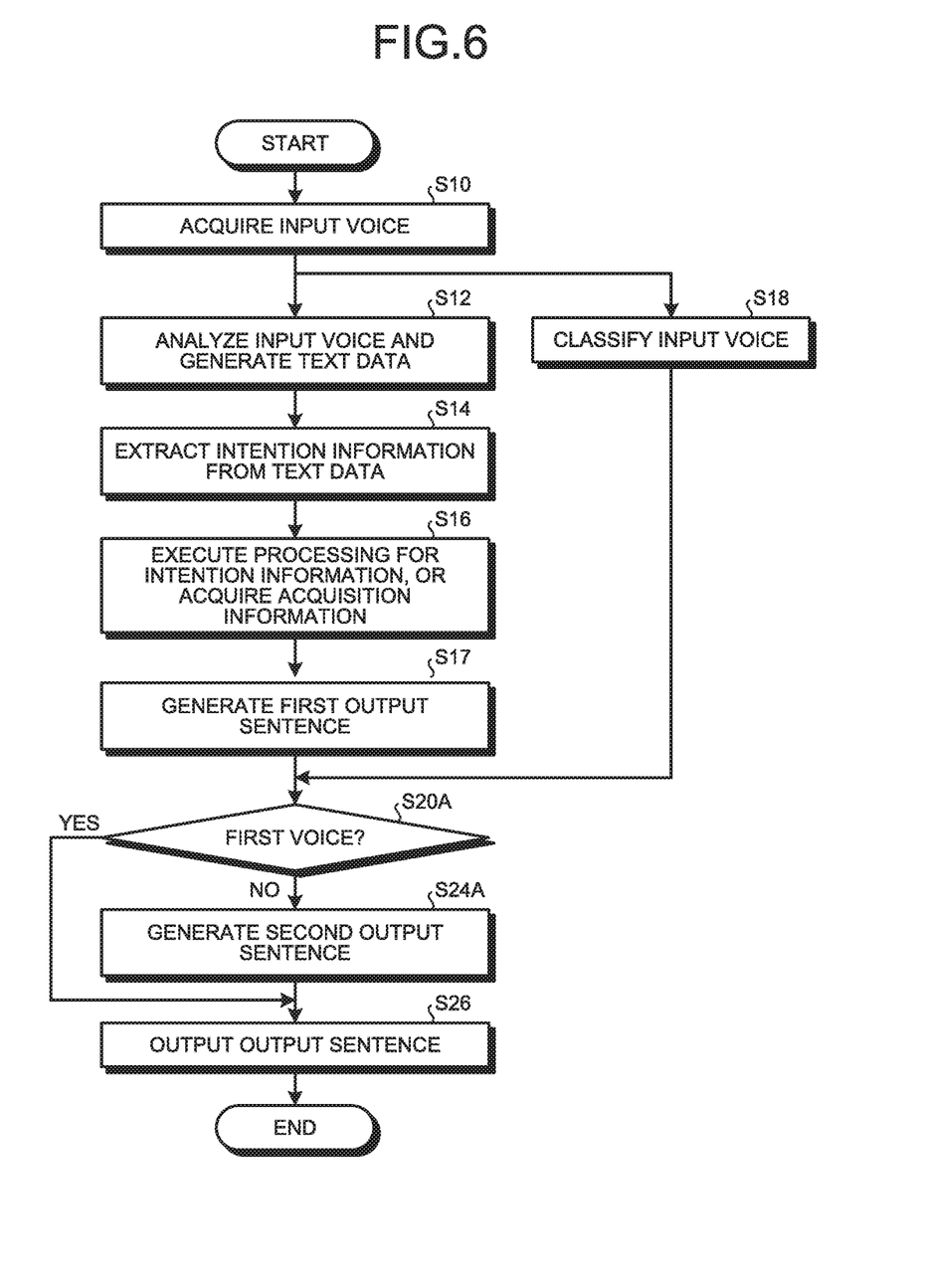
FIG. 6 is a flow chart illustrating another example of the flow of the output processing for the output sentence.

FIG. 6 is a flow chart illustrating another example of the flow of the output processing for the output sentence. When the voice V1 is the second voice V1B, the voice-content generating unit 36 according to the above described embodiment generates the second output sentence without generating the first output sentence. However, after generating the first output sentence, the voice-content generating unit 36 may generate the second output sentence by omitting a part of the information of the generated first output sentence. That is, as illustrated in FIG. 6, after the processing by the acquisition content information acquiring unit 52 has been performed at Step S16, the voice-content generating unit 36 generates the first output sentence without referring to the classification result for the voice V1, that is, regardless of the classification result (Step S17). When, after generating the first output sentence, the voice V1 is determined to be the first voice V1A (Step S20A; Yes), the voice-content generating unit 36 proceeds to Step S26, and outputs that first output sentence. On the contrary, when, after generating the first output sentence, the voice V1 is determined not to be the first voice V1A (Step S20A; No), that is, the voice V1 is determined to be the second voice V1B, the voice-content generating unit 36 generates the second output sentence by omitting a part of the information of the generated first output sentence (Step S24A), and generates the second output sentence. The information omission method for the second output sentence in this case may be the method that has been described already.

Second Embodiment

Next, a second embodiment is explained. While the output-content control device 1 according to the first embodiment includes the voice detecting unit 10 and the voice output unit 12, an output-content control device 1A according to the second embodiment does not include the voice detecting unit 10 and the voice output unit 12. In the second embodiment, explanation of parts having the common configurations with the first embodiment is omitted.

Figure 7:
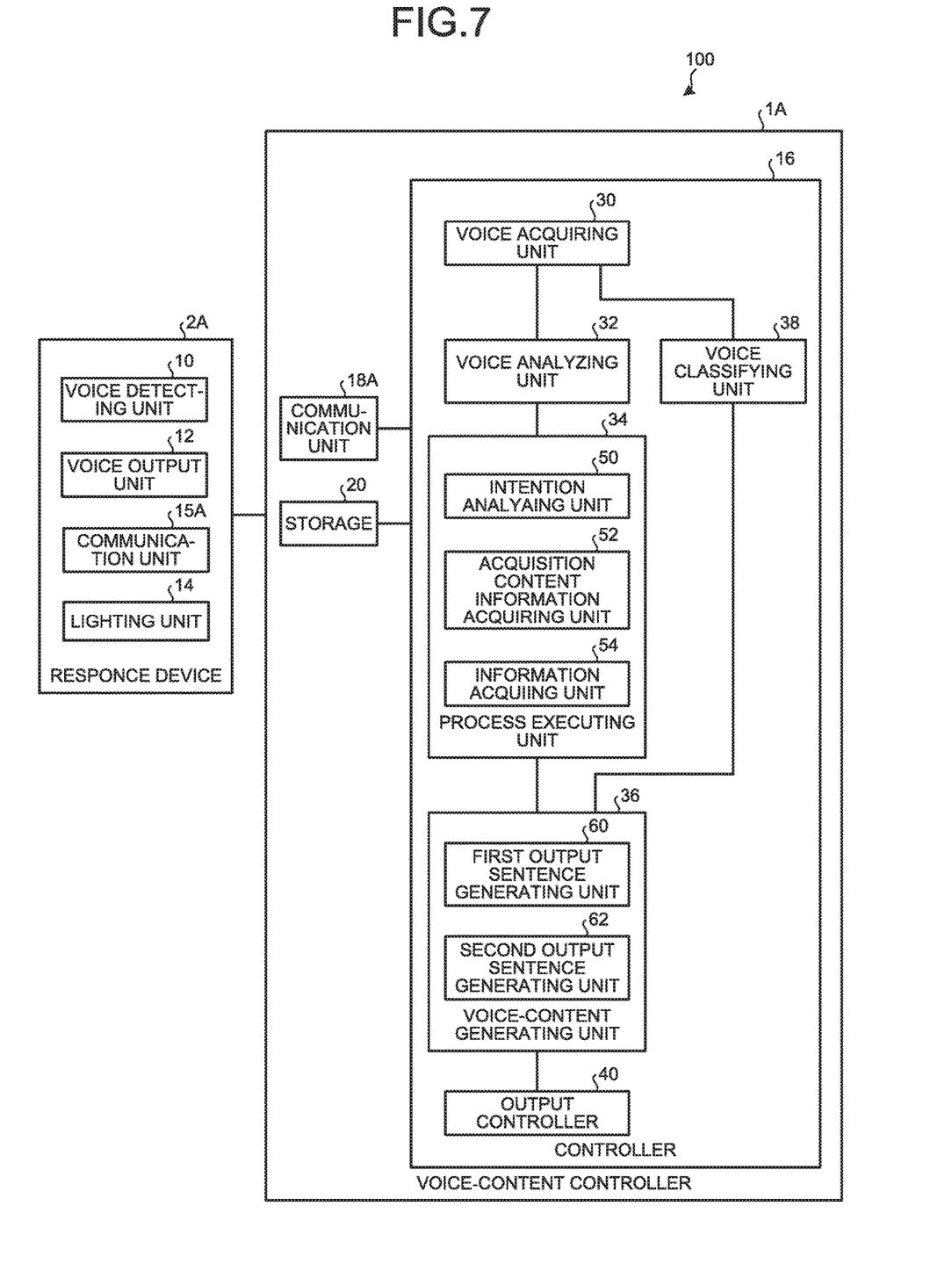
FIG. 7 is a schematic block diagram of a voice processing system according to a second embodiment.

FIG. 7 is a schematic block diagram of an information output system according to the second embodiment. As shown in FIG. 7, an information output system 100 according to the second embodiment includes the voice-content control device 1A and a response device 2A. The response device 2A is, for example, a smart speaker, and includes the voice detecting unit 10, the voice output unit 12, the lighting unit 14, and a communication unit 15A. The voice-content control device 1A is a device (server) positioned distant from the response device 2A, and includes the controller 16, a communication unit 18A, and the storage 20. The voice-content control device 1A and the response device 2A are connected by wireless communication, but can be connected by wired communication.

The voice-content control device 1A acquires the voice V1 that has been detected by the voice detecting unit 10 through information communication via the communication unit 15A and the communication unit 18A. The voice-content control device 1A then generates the output sentence by performing similar processing as the first embodiment, and output the output sentence to the response device 2A. The response device 2A converts the output sentence into the voice data by the voice output unit 12 to output as the voice V2. Note that the voice-content control device 1A can generate the output sentence and transmit to the response device 2A. In this case, the voice output unit 12 outputs the acquired voice data as the voice V2. As described, the information output system 100 includes the voice-content control device 1A, the voice detecting unit 10 that detects the voice V1 spoken by the user H, and the voice output unit 12 that outputs the output sentence generated by the voice-content generating unit 36 as the voice V2. As described above, the voice-content control device 1A produces effects similar to those of the first embodiment even when the response device 2A is a separate unit.

According to the present application, on outputting the voice to the user, the influence of the output voice on people other than the user is able to be suppressed, and the content of the voice output to the user is able to be made adequately understandable.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A voice-content control device, comprising:
   a proximity sensor configured to calculate a distance between a user and the voice-content control device;
   a voice classifying unit configured to analyze a voice spoken by a user and acquired by a voice acquiring unit to classify the voice as either one of a first voice or a second voice based on the distance between the user and the voice-content control device;
   a process executing unit configured to analyze the voice acquired by the voice acquiring unit to execute processing required by the user;
   a voice-content generating unit configured to generate, based on content of the processing executed by the process executing unit, output sentence that is text data for a voice to be output to the user; and
   an output controller configured to adjust a sound volume of voice data obtained by converting the output sentence thereinto, wherein
   the voice-content generating unit is further configured to
   generate a first output sentence as the output sentence when the acquired voice has been classified as the first voice, and
   generate a second output sentence in which information is omitted as compared to the first output sentence as the output sentence when the acquired voice has been classified as the second voice, wherein
   the output controller is further configured to adjust the sound volume of voice data such that the sound volume of voice data obtained by converting the first output sentence thereinto differs from the sound volume of the voice data obtained by converting the second output sentence thereinto.

2. The voice-content control device according to claim 1, wherein
the process executing unit comprises:
an intention analyzing unit configured to extract intention information indicating an intention of the user based on the voice acquired by the voice acquiring unit; and
an acquisition content information acquiring unit configured to acquire acquisition content information which is notified to the user based on the extracted intention information, and
the voice-content generating unit is further configured to generate the text data including the acquisition content information as the output sentence.

3. The voice-content control device according to claim 1, wherein, on generating the second sentence, the voice-content generating unit is further configured to omit a part of information included in the voice spoken by the user.

4. A voice-content control method, comprising:
calculating a distance between a user and a voice-content control device;
acquiring a voice spoken by a user;
analyzing the acquired voice to classify the acquired voice as either one of a first voice and a second voice based on the distance between the user and the voice-content control device;
analyzing the acquired voice to execute processing intended by the user;
generating, based on content of the executed processing, output sentence that is text data for a voice to be output to the user; and
adjusting a sound volume of voice data obtained by converting the output sentence thereinto, wherein
at the generating,
a first output sentence is generated as the output sentence when the acquired voice has been classified as the first voice, and
a second output sentence is generated as the output sentence in which a part of information included in the first output sentence is omitted when the acquired voice has been classified as the second voice, wherein
at adjusting the sound volume of voice data, further adjusting the sound volume of voice data such that the sound volume of voice data obtained by converting the first output sentence thereinto differs from the sound volume of voice data obtained by converting the second output sentence thereinto.

5. A non-transitory storage medium that stores a voice-content control program that causes a computer to execute:
calculating a distance between a user and a voice-content control device;
acquiring a voice spoken by a user;
analyzing the acquired voice to classify the acquired voice as either one of a first voice and a second voice based on the distance between the user and the voice-content control device;
analyzing the acquired voice to execute processing intended by the user;
generating, based on content of the executed processing, output sentence that is text data for a voice to be output to the user; and
adjusting a sound volume of voice data obtained by converting the output sentence thereinto, wherein
at the generating,
a first output sentence is generated as the output sentence when the acquired voice has been classified as the first voice, and
a second output sentence is generated as the output sentence in which a part of information included in the first output sentence is omitted when the acquired voice has been classified as the second voice, wherein
at adjusting the sound volume of voice data, further adjusting the sound volume of voice data such that the sound volume of voice data obtained by converting the first output sentence thereinto differs from the sound volume of voice data obtained by converting the second output sentence thereinto.

\* \* \* \* \*